May 17, 1960     A. A. GRIFFITH ET AL     2,936,969
JET SUSTAINED AND PROPELLED AIRCRAFT
Filed June 7, 1956     6 Sheets-Sheet 1

Inventors
Alan Arnold Griffith
William Shaw
by
Leach and Radue
Attorneys

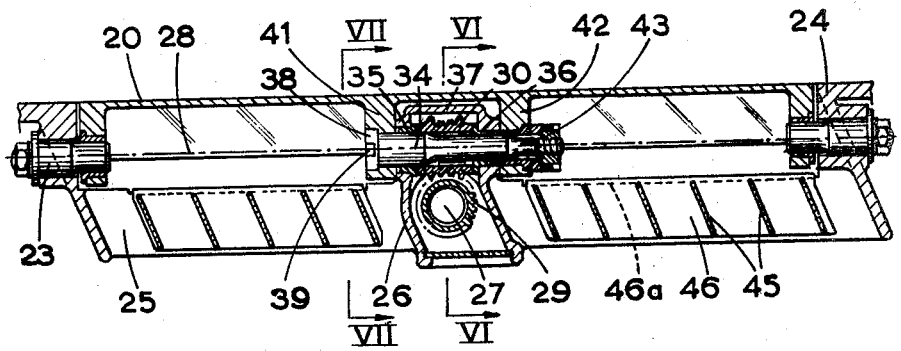
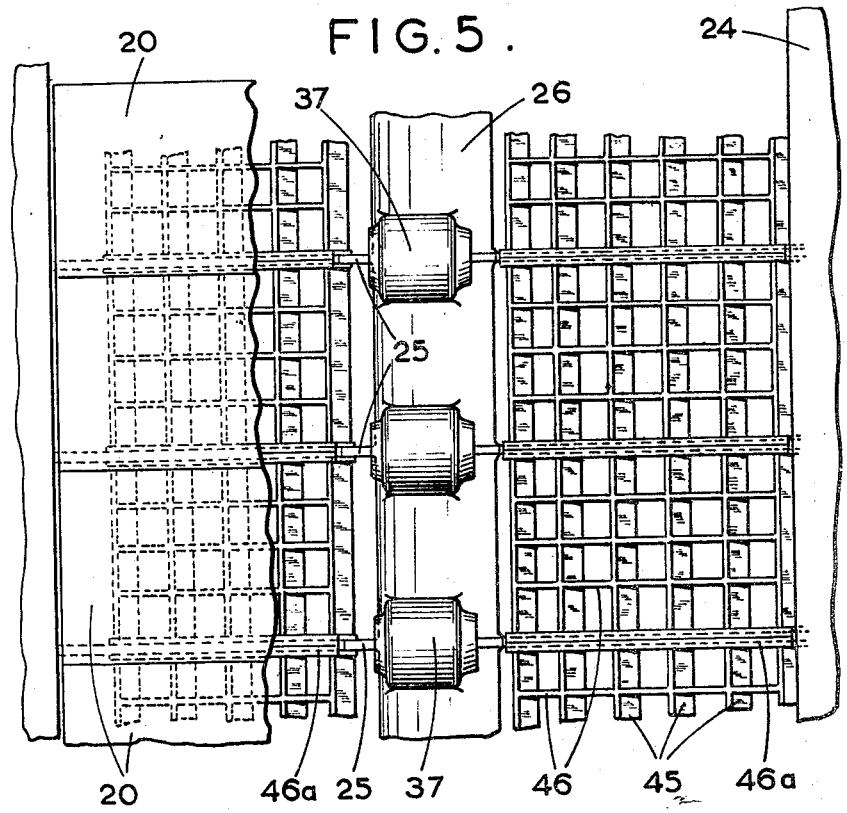

May 17, 1960  A. A. GRIFFITH ET AL  2,936,969
JET SUSTAINED AND PROPELLED AIRCRAFT
Filed June 7, 1956  6 Sheets-Sheet 6
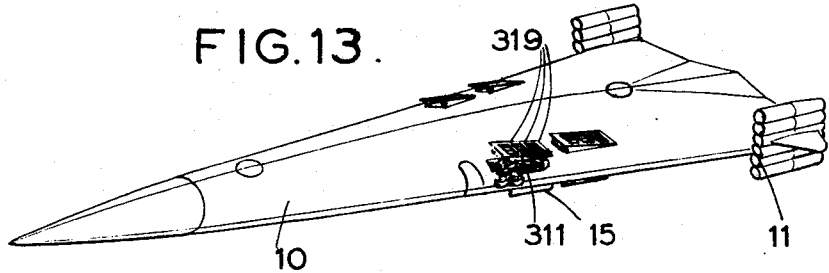
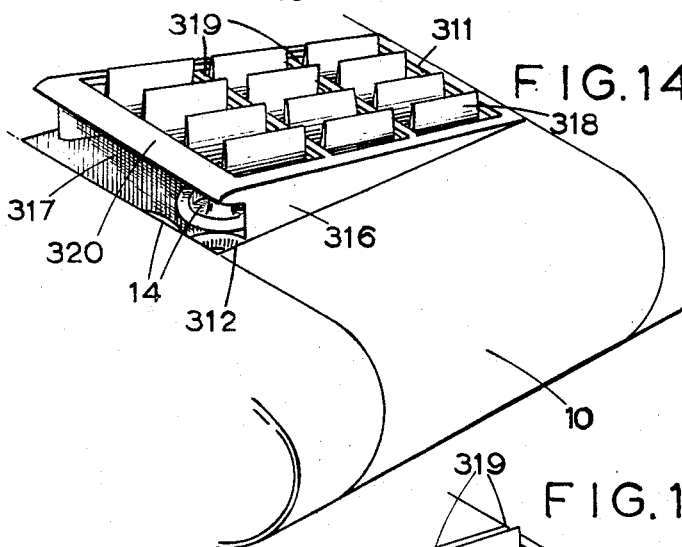
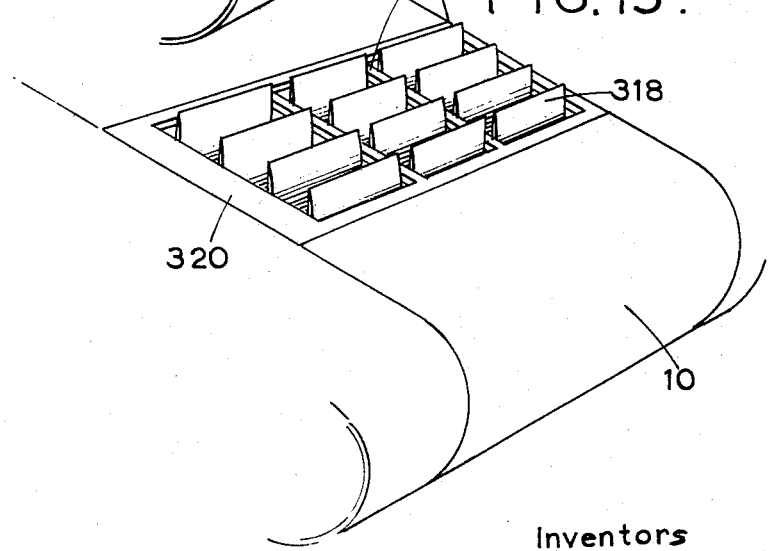
Inventors
Alan Arnold Griffith
William Shaw
by
Larch and Radue
Attorneys United States Patent Office
2,936,969
Patented May 17, 1960

2,936,969

JET SUSTAINED AND PROPELLED AIRCRAFT

Alan Arnold Griffith, Derby, and William Shaw, Alvaston, England, assignors to Rolls-Royce Limited, Derby, England Application June 7, 1956, Serial No. 589,941

Claims priority, application Great Britain June 8, 1955

13 Claims. (Cl. 244—12)

This invention relates to aircraft, and is particularly concerned with aircraft of the type having propulsion means, preferably including a plurality of engines, for use primarily in propelling the aircraft in a forward direction (such engines will be referred to hereinafter as "propulsion engines") and also having a plurality of gas turbine jet-propulsion engines for use primarily in producing a vertical thrust on the aircraft (the latter engines will be referred to hereinafter as "lift engines"). Such aircraft will be referred to as "aircraft of the jet-lift type."

It will be appreciated that the propulsion engines may be arranged so that their lines of thrust may be varied through an acute angle, for example for control purposes, though in the preferred arrangement the propulsion engines are mounted in fixed alignment in the aircraft, and likewise the lines of thrust of the lift engines may be varied through an acute angle, for example to provide a forward or rearward component of thrust to accelerate or decelerate the aircraft, respectively.

It will also be appreciated that the lift engines will normally be used during the take-off and at least the initial phase of the climb, and during the landing and at least the last phase of the descent of the aircraft, but will be stopped during cruising flight.

According to this invention, therefore, an aircraft of the jet-lift type includes means for starting the lift engines of the aircraft in flight comprising means to conduct ram air pressurised by the forward flight of the aircraft to the compressor intakes of the lift engines to cause the engines to windmill at such a rotational speed that, on injection and ignition of fuel in their combustion chambers, the rotation of the engines becomes self-sustaining.

Preferably the starting means comprises an air intake in the aircraft having closure means to open and close the intake, and which when the intake is closed lie flush with the surface of the body of the aircraft, and means when the intake is opened to cause the air flowing over the aircraft, due to its forward flight to be deflected towards the compressor intakes of the lift engines.

The closure means and the deflector means may be afforded by vanes which are adjustable between a position in which they lie flush with the surface of the body of the aircraft, and a position in which they form passages between them through which the air flow over the aircraft is deflected towards the compressor intakes of the lift engines. In the second position the vanes preferably project from the surface of the aircraft.

In one arrangement in accordance with this feature of the invention, the vanes are adjustable from the flush position, through the deflecting position, to a position in which they form passages which are substantially at right angles to the surface of the aircraft.

The closure means may comprise a door or doors, which when closed lie flush with the surface of the aircraft, and the deflector means is afforded by vanes which lie within the doors when these are closed.

In one arrangement in accordance with the invention the doors move substantially parallel to the surface of the aircraft and lie within the skin of the aircraft when the intake is open. In another arrangement the doors may be hinged adjacent one or both longitudinally-extending edges of the intake opening.

The vanes may be pivoted to project through the intake opening when the doors are opened.

The vanes may be formed effectively in one piece, or may be formed with a main portion, including the leading edge, which is adjustable between the position in which is lies flush with the surface, or lies within the doors, and the position in which it deflects the air towards the compressor intakes, and with a trailing portion which is either independently adjustable or is free to trail in accordance with the forces exerted on it by the airflow.

Where the lift engines are angularly adjustable, for example to have their upper ends inclined towards the front of the aircraft to provide a forward component of thrust when the aircraft is climbing, or towards the rear of the aircraft to provide a rearward or braking component when the aircraft is descending, the trailing portions of the vanes are preferably adjusted to be substantially aligned with the longitudinal axes of the engines.

In yet another form of this invention the air intake is normally closed by a door lying flush with the surface of the aircraft which can be raised about a hinge at the rear of the door with flanges at the side of the door closing the spaces between the door and the sides of the air intake opening so that the front of the said door forms a forwardly-projecting scoop to take in air flowing over the aircraft and deflect it down into the compressor intakes of the lift engines arranged under the door. The top of the door may be formed in part by a series of vanes preferably on axes lying in the fore-and-aft direction which can be moved from a position in which they lie flush with the surface of the door to one in which they leave openings through the door above the compressor intakes of the lift engines arranged under the door.

Four embodiments of this invention will now be described with reference to the accompanying drawings in which:

Figure 1 is a plan view of an aircraft of the jet-lift type, showing one arrangement of the invention, Figure 2 is an elevation of the aircraft of Figure 1, Figure 3 is a section on the line III—III of Figure 1, Figure 4 is a detail view corresponding to Figure 3, showing the first arrangement, Figure 5 is a true view of the parts illustrated in Figure 4, seen from above with the vanes partially cut away.

Figure 13 is a perspective view of an aircraft of the jet lift type showing yet a different arrangement of the invention, and Figures 14 and 15 are detail views on an enlarged scale showing one of the doors illustrated in Figure 13.

Figure 1:
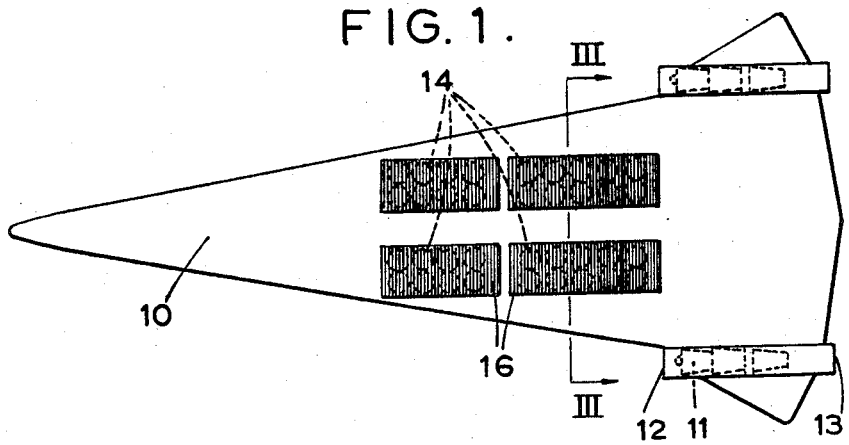
Figure 2:
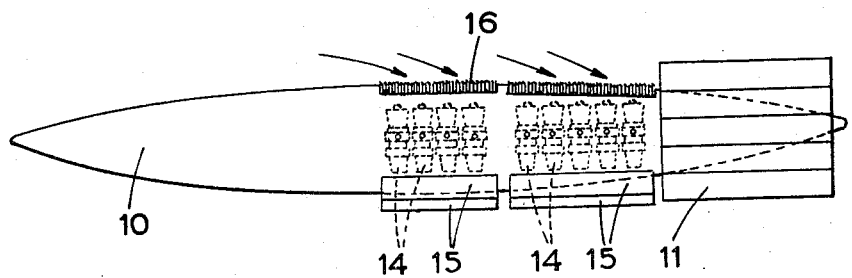
Figure 3:
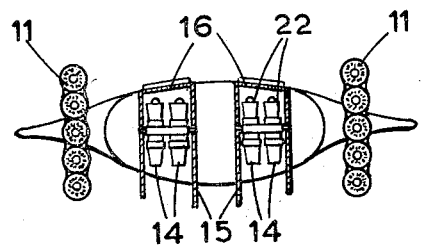
Figure 6:
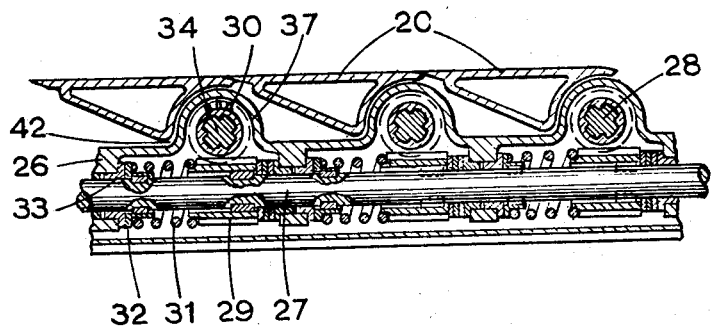
Figure 6 is a section on the line VI—VI of Figure 4, showing parts in one position.
Figure 7:
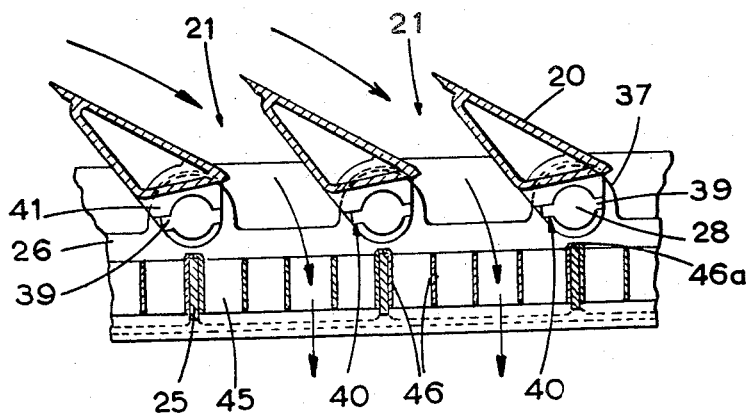
Figure 7 is a section on the line VII—VII of Figure 4, showing parts in another position.

Referring now to Figures 1–3, there is shown an aircraft of substantially delta plan form having a small apex angle at the nose, and thus forming substantially an isosceles triangle. The crew, fuel and equipment are disposed within the body 10, which also forms a sustaining surface, of relatively small area as compared with present practice. There are provided two banks of propulsion engines 11, one bank adjacent each of the base angles of the isosceles triangle, and each bank consists of a number of gas-turbine jet-propulsion engines mounted vertically one above the other. The banks extend above and below the adjacent part of the aircraft body, as will be seen from Figure 3, and have their intakes 12 facing forwards and their exhausts 13 directed rearwardly.

Also mounted within the body of the aircraft are four banks of lift engines 14, the thrust from which sustains the aircraft during take-off and landing; the lift engines are gas turbine jet-propulsion engines, and the two forward banks, one on either side of the longitudinal centre-line, each contain eight engines in pairs, while the two correspondingly-disposed rear banks each contain ten engines in pairs.

Doors 15 are provided in the underside of the body of the aircraft, which are opened before starting the lift engines, a pair of doors being shown for each bank of engines, and an air intake 16 is also provided for each bank of engines on the top of the body.

One arrangement of air intake in accordance with the invention is shown in greater detail in Figures 4–7, and comprises a series of pivoted vanes 20 which in one position (shown in Figure 6) close off the intake 16 and afford a smooth external surface to the body of the aircraft, and which in another position (shown in Figure 7) afford intake openings 21 which deflect the airstream flowing over the exterior of the aircraft, due to its forward flight, towards the compressor intakes 22 of the lift engines 14.

The pivoted vanes 20 may be moveable to a third position, in which the passages 21 between them extend substantially vertically, for use during the vertical take-off or landing of the aircraft.

Each of the pivoted vanes 20 is mounted at its ends by means of pivot pins 23 secured to a thickened part 24 of the aircraft structure surrounding the intake opening, and is also supported between its ends by means providing the drive for pivoting the vanes. The aircraft structure is formed with a number of ribs 25 which extend transversely across the intake opening, and with a beam 26 integral with the ribs and extending fore-and-aft of the opening and approximately across its centre. The beam is thicker than the ribs and is hollow to contain the main drive-shaft 27 for pivoting the vanes 20. This drive shaft is driven, for example, by an electric motor, and rotates each of the vanes 20 about their pivotal axes 28 by means of a worm 29 and worm-wheel 30. The worm 29 (see Figure 6) is keyed to the shaft 27 and is normally held in fixed axial relation to the shaft by a spring 31 which has its other abutment 32 also keyed to the shaft and prevented from axial movement by abutting a radial face of a bush 33 in which the shaft is mounted. The worm-wheel 30 is in splined engagement with the central portion of a bolt 34 which is supported in bushes 35, 36 in a swelling 37 rising from the hollow beam 26 the head 38 of the bolt projecting outside one wall of the swelling 37 and being formed with ears 39 which engage with corresponding slots 40 in a flange 41 on the vane 20, and the threaded end projecting outside the opposite wall of the swelling 37 and passing through another flange 42 on the vane to engage with a nut 43 which is tightened against the flange and suitably locked. The flanges 41, 42 lie against the walls of the swelling 37 to locate the vane against endwise movement, and the vane is supported by the bolt 34, which is secured to it, resting in the bushes 35, 36 in the swelling 37 on the beam. On rotation of the worm 29, the worm-wheel 30 is rotated to drive the bolt 34 to which it is splined, and thus to rotate the vane 20 about its pivotal axis 28 by means of the ears 39.

The vanes 20 are so designed that they are capable of being opened to a substantial extent independently of one another, and the arrangement described above provides that, should one of the vanes jam in the closed position, due for example to being damaged in flight, the drive shaft 27 is not prevented from rotating, but the worm 29 associated with the damaged vane advances along the shaft 27 compressing the spring 31, and the other vanes are opened in substantially the normal way. Thus if there are, say, thirty-two vanes in the intake, its effective area is only reduced by about one thirty-second should one vane jam.

Between the vanes 20 and the compressor intakes 22 there is provided a set of fixed vanes in the form of a grid having thin longitudinal and lateral vertical slats 45, 46 extending across the intake. The grid is supported from the ribs 25, and may be made in sections with the end lateral slats of each section bent over to form flanges 46a (best seen in Figure 7) to locate the sections in position. The fixed vanes 45, 46 serve to straighten the flow of air due to the forward motion of the aircraft, which is deflected into the intake by the vanes 20, when these are for example in the position shown in Figure 7, before the air reaches the compressor intakes 22 of the lift engines.

Figure 8:
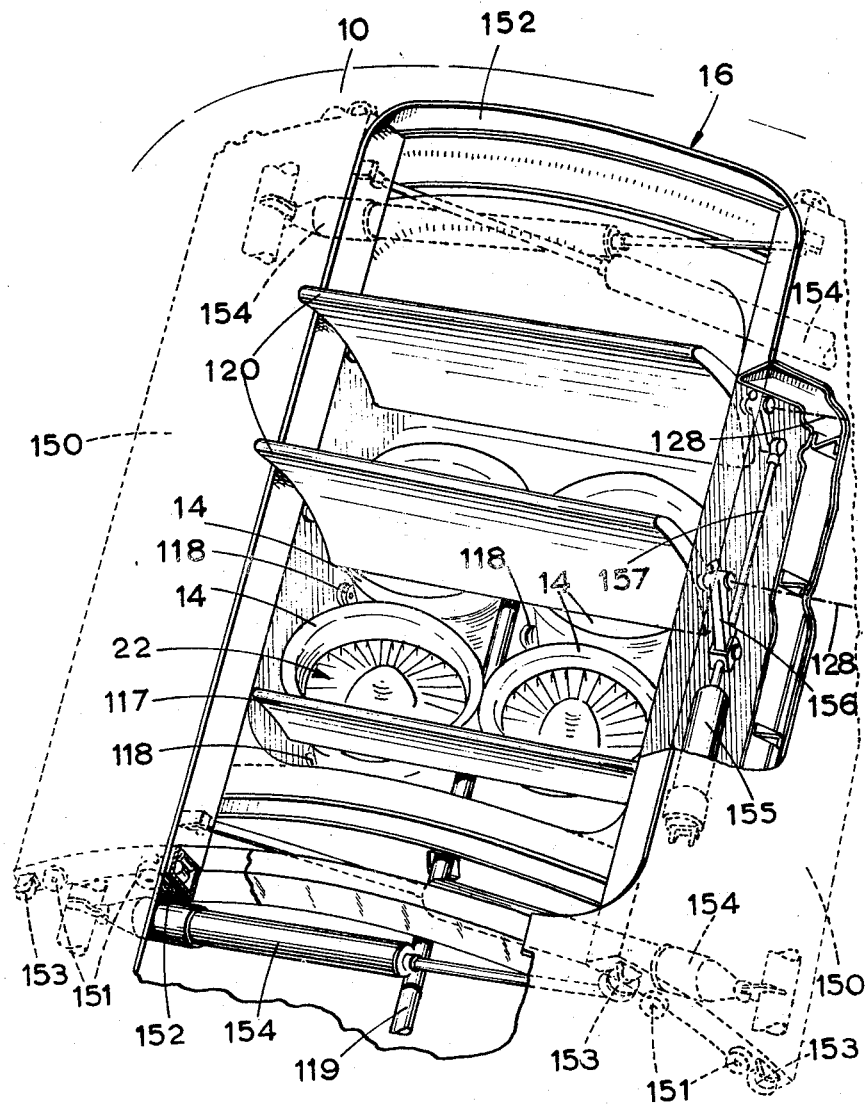
Figure 8 is a perspective view of a second arrangement of the invention.
Figure 9:
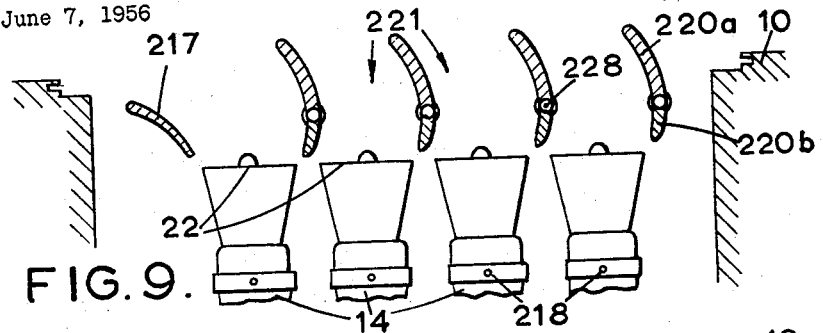
Figures 9 to 12 are diagrammatic views, being vertical longitudinal sections, of a third arrangement of the invention, with parts in various positions.
Figure 10:
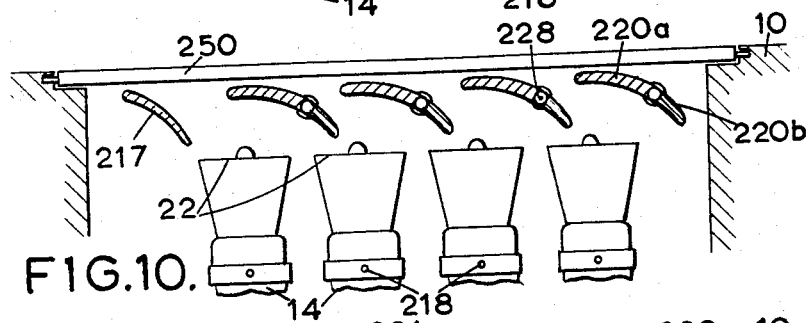

Another arrangement in accordance with the invention is shown in the perspective view of Figure 8.

In this arrangement a pair of doors 150 are provided which when closed have their external surface flush with the surface of the body 10 of the aircraft, and enclose the vanes 120.

The doors may be supported by any convenient linkage arrangement, or may be mounted on rollers 151 which run on the flanges of channel-section members 152 extending peripherally of the body of the aircraft. Further rollers 153 may be provided to co-operate with the webs of members 152 to prevent endwise movement of the doors 150. The doors may be actuated by, for example, hydraulic rams 154 anchored to structural members of the aircraft. Two movable vanes 120 are shown, which are pivoted about axes which lie below the doors 150. These vanes may be operated by a ram 155, anchored to aircraft structure, through radius arms 156 and links 157, and may be dimensioned so that they may be pivoted to project through the intake opening when the doors 150 are open. The vanes 120 are shown as each being formed in one piece, that is, each vane pivots as a whole.

In addition a fixed vane 117 is provided, and the vanes 117, 120 together serve to deflect air into the compressor intakes 22 of the jet lift engines 14 four of which are shown.

The jet lift engines 14 may be mounted, for example on trunnions 118, to pivot about a transverse axis, for example to provide a forward component of thrust during the initial climb of the aircraft. The engines may be rocked about their pivotal axes by a rod 119. In a case such as the above it may be desirable to provide an arrangement such as is shown diagrammatically in Figures 9–12.

In this arrangement, which is similar to that shown in Figure 8, the aircraft is provided with doors 250 (Figure 10) and the vanes 220 are each formed in two parts 220a, 220b which are separately pivotable about a common axis 228. The major part 220a of each vane, which includes the leading edge, is connected to a mechanism such as for example that shown in Figures 4–7 or in Figure 8, to be adjusted about the axis 228. When the doors 250 are open the parts 220a may be pivoted to the position shown in Figure 9 to afford passages 221 between them through which the air is deflected towards the compressor intakes 22 of the lift engines 14, and when the doors are to be closed the parts 220a will be pivoted to the position shown in Figure 10 in which they lie within, and clear of the doors in their closed position. A fixed vane 217 is also provided at the forward end of the intake opening.

Figure 11:
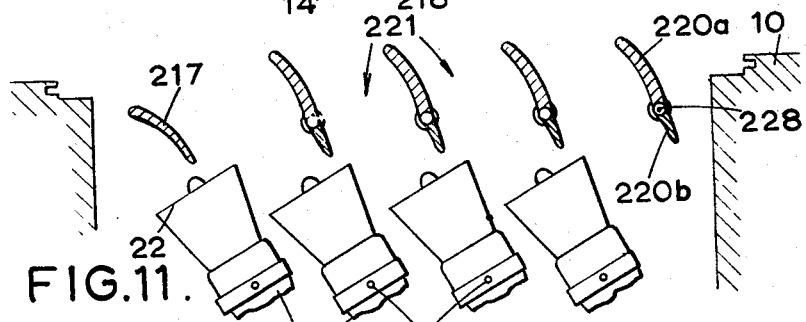
Figure 12:
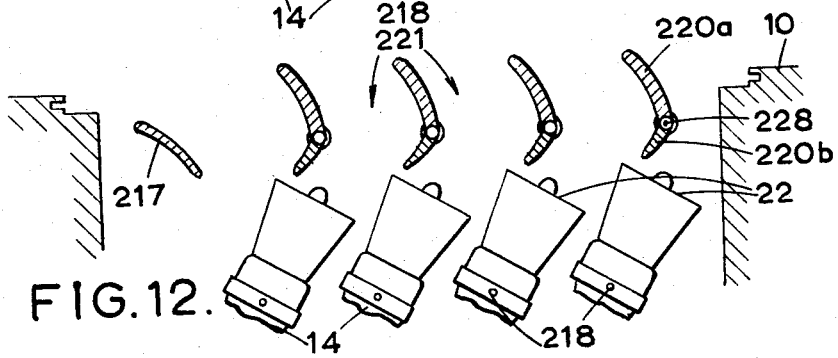

The jet lift engines are mounted on trunnions 218 adjacent their centres of gravity to pivot about axes running transversely of the aircraft, and may be pivoted so that their forward ends are inclined towards the front of the aircraft, to give a forward component of thrust to assist, for example, in the climb of the aircraft (as shown in Figure 11) or towards the rear of the aircraft, to give a rearward or braking component of thrust to assist, for example, in decelerating the aircraft during its descent (as shown in Figure 12). In the former case the trailing parts 220b of the vanes may be pivoted rearwards, to be substantially aligned with the axes of the engines, and in the latter case the trailing parts may be pivoted forwards, so that the vane has a large camber and the trailing parts are again aligned with the axes of the engines. The trailing parts 220b of the vanes may be operated by a mechanism such as that shown in Figures 4–7, or that in Figure 8.

In a modification, the trailing parts 220b of the vanes may be free to swing, and they will thus take up a position determined by the pressure loads acting on them due to the airflow.

In the arrangements shown in Figures 13 to 15 the aircraft 10 is similar to that shown in Figures 1–3 but is provided with doors 311 which cover the openings 312 of intakes 16 in the body above each group of vertical lift engines 14 which discharge downwards through doors 15 on the underside of the body.

The doors 311 have side cheeks 316 in contact with the sides of the openings 312 so that when the doors are raised into the position shown in Figures 13 and 14 there is presented a vertical rectangular forward-pointing opening 317. The doors 311 are preferably hinged adjacent their rear edge.

In addition the doors 311 each have vanes 318 in three series of four, and the vanes 318 are hinged about fore-and-aft axes to cross members 319 and 320, the members 320 being formed in the shape of the leading edge of an aerofoil and forming the front of the door.

Any convenient means may be provided for raising the doors from the position which they occupy in Figure 15 to that which they occupy in Figures 13 and 14 and for pivoting the vanes through a right angle from the flush position which they occupy in Figure 13 to that which they occupy in Figures 14 and 15.

In normal flight the doors 311 lie flush with the external surface of the aircraft, as shown in Figure 15, but with the vanes 318 flush with the doors as shown in Figure 13.

When it is desired to start the vertical lift engines 14 by ram effect, the doors 311 are raised until they occupy the position shown in Figure 13 (with the vanes 318 in the closed position) and air will be forced under the doors and will enter the compressors of the vertical lift engines.

When the engines have started, the vanes are pivoted to the position shown in Figure 14, which may be considered the normal running position with the aircraft moving forward and the vertical lift engines in operation.

When the aircraft has reduced speed so that the ram effect is no longer important, the doors 311 may be closed to the position shown in Figure 15 which is the position which they occupy for vertical descent and for ground running.

Each of the four arrangements described allows the intakes 16 to be opened and closed, and provides means for deflecting air flowing over the surface of the aircraft, due to its forward speed, towards the compressor intakes 22 of the lift engines 14 without undue loss of ram pressure, so as to cause windmilling of the engines at such a rotational speed that, on injection and ignition of fuel in their combustion chambers, the rotation of the engines becomes self-sustaining. The fuel and ignition systems of the lift engines may be of any known or convenient sort. Thus the lift engines may be stopped and have their intakes 16 and exhaust doors 15 closed during the major part of a flight, and the engines may be started in this manner before landing. The invention provides arrangements which avoid the necessity for electric starter motors for the lift engines, or compressed air tappings from the propulsion engines to the lift engines for starting.

We claim:

1. An aircraft of the jet-lift type having a body of aerodynamic sustaining form carrying propulsion engines with their thrust axes substantially horizontal, lift engines of the gas propulsion, jet-lift type having air compressors with intakes and arranged with their thrust axes substantially vertical, tunnels extending vertically through said body from top to bottom housing said lift engines, means for starting the lift engines when in forward flight comprising, an air intake in the upper surface of the body for said tunnels having means to open and close the intake which lie flush with said surface when the intake is closed and means to cause some of the air flowing over the aircraft due to its forward flight to be deflected toward the lift engine air compressor intakes when the tunnel intake is open to cause the lift engines to windmill at such a rotational speed that, on injection and ignition of fuel the rotation of the engines becomes self-sustaining.

2. An aircraft as claimed in claim 1 in which the closure and deflector means are vanes, means mounting said vanes to be adjustable between a position in which they lie flush with the surface of the body of the aircraft, and a position in which they form passages between them and direct the airflow over the aircraft towards the compressor intakes of the lift engines.

3. An aircraft as claimed in claim 2 in which the vanes, when they act to deflect the air towards the compressor intakes of the lift engines have portions which project beyond the surface of the aircraft.

4. An aircraft as claimed in claim 2 in which means is provided to adjust the vanes from the flush position through the deflecting position to a position in which they form passages which are substantially at right angles to the surface of the aircraft.

5. An aircraft as claimed in claim 1 in which the closure means for the tunnel air intake comprises a door which when closed lies flush with the surface of the aircraft, and the deflector means comprises vanes, and means mounting said vanes to lie within the doors when these are closed.

6. An aircraft according to claim 5 in which means mounts said door to move substantially parallel to the surface of the aircraft and lie within the skin of the aircraft when the intake is open.

7. An aircraft as claimed in claim 5 in which means mounts the vanes to pivot so as to project through the intake opening when the door is opened.

8. An aircraft as claimed in claim 2 in which the vanes are each formed with a main portion, including the leading edge, means to adjust said portion between the position in which it lies within the doors, and the position in which it deflects the air towards the compressor intakes, and with a trailing portion, and means to position said trailing portion independently in accordance with the forces exerted on it by the airflow.

9. In an aircraft as claimed in claim 8, transverse pivots for engines, means to angularly adjust said engines about said pivots, and means insuring the trailing portions of the vanes to be substantially aligned with the longitudinal axis of the engines.

10. An aircraft as claimed in claim 1, a door normally closing said air intake and lying flush with the surface of the aircraft, a hinge at the rear of the door with flanges at the sides of the door closing the spaces between the door and the sides of the air intake, a hinge for the rear edge of said door, means to raise the front of said door so that the said door forms a forwardly-projecting scoop to take in air flowing over the aircraft and deflect it down into the compressor intakes of the lift engines arranged under the door.

11. An aircraft as claimed in claim 10, a series of vanes forming in part the top of the door, means to move said vanes from a position in which they lie flush with the surface of the door to one in which they leave openings through the door above the compressor intakes of the lift engines arranged under the door.

12. An aircraft as claimed in claim 11 in which the vanes are hinged about axes extending in the fore-and-aft direction of the aircraft.

13. In an aircraft as claimed in claim 2, a worm and wormwheel device adapted to raise and lower said vanes and having a common operating shaft carrying a number of worms each engaging a wormwheel, means connecting each wormwheel to a vane whereby it is raised or lowered, each worm being axially displaceable on its shaft, a spring biasing said worm against a stop so that in the event of any one or more vanes sticking in the closed position the reaction between the wormwheel and its worm will cause displacement of the worm along its shaft against the reaction of its spring, which movement permits the continued turning of the shaft carrying the worms and the operation accordingly of the non-sticking vanes.

References Cited in the file of this patent

UNITED STATES PATENTS

| | | |
|---|---|---|
| 2,381,705 | Vokes | Aug. 7, 1945 |
| 2,389,313 | Hunter | Nov. 20, 1945 |
| 2,502,045 | Johnson | Mar. 28, 1950 |
| 2,567,392 | Naught | Sept. 11, 1951 |
| 2,712,217 | Sargent et al. | July 5, 1955 |
| 2,736,514 | Ross | Feb. 28, 1956 |
| 2,755,040 | Pinkos et al. | July 17, 1956 |